United States Patent [19]

Agarwal et al.

[11] 4,310,457

[45] Jan. 12, 1982

[54] HOT MELT ADHESIVE COMPOSITIONS

[75] Inventors: Pawan K. Agarwal, Westfield, N.J.; Henry S. Makowski, deceased, late of Scotch Plains, N.J., by Patricia H. Makowski, executrix

[73] Assignee: Exxon Research & Engineering Co., Florham Park, N.J.

[21] Appl. No.: 196,210

[22] Filed: Oct. 14, 1980

[51] Int. Cl.$^3$ ............................................. C08L 91/00
[52] U.S. Cl. .............................. 260/235; 260/33.6 A; 260/33.6 AQ
[58] Field of Search ......... 260/23 S, 33.6 A, 33.6 AQ

[56] References Cited

U.S. PATENT DOCUMENTS

| | | | |
|---|---|---|---|
| 3,917,551 | 11/1975 | Jurreus et al. | 260/27 BB |
| 3,932,328 | 1/1976 | Korpman | 260/27 BB |
| 3,932,341 | 1/1976 | Kutch et al. | 260/33.6 AQ |
| 4,137,203 | 1/1979 | Makowski et al. | 260/23.5 A |
| 4,158,653 | 6/1979 | Chung | 260/33.6 AQ |
| 4,169,822 | 10/1979 | Kutch et al. | 260/27 BB |

*Primary Examiner*—Joseph L. Schofer
*Assistant Examiner*—Bernard Lipman
*Attorney, Agent, or Firm*—Richard E. Nanfeldt

[57] ABSTRACT

This invention relates to hot melt adhesive compositions which includes a neutralized sulfonated polystyrene resin wherein the neutralized sulfonated polystyrene resin has about 5 to about 250 meq. of neutralized sulfonate groups per 100 grams of the neutralized sulfonated polystyrene resin and about 25 to about 250 parts by weight of a hydrocarbon resin of a petroleum or coal tar distillate, aliphatic dienes and mono and diolefins, cyclic olefins of 5 or 6 carbon atoms and hydrogenated poly cyclics per 100 parts by weight of the neutralized sulfonated polystyrene resin. Additionally, an unsaturated hydrocarbon polymer such as polyisoprene and polybutadiene can be incorporated into the adhesive compositions.

10 Claims, No Drawings

HOT MELT ADHESIVE COMPOSITIONS

BACKGROUND OF THE INVENTION

1. Field of the Invention

This invention relates to hot melt adhesive compositions which include a neutralized sulfonated polystyrene resin wherein the neutralized sulfonated polystyrene polymer has about 5 to about 250 meq. of neutralized sulfonate groups per 100 grams of the neutralized sulfonated polystyrene polymer, and about 25 to about 200 parts by weight of a hydrocarbon resin of a petroleum or coal tar distillate, having about 5 to about 6 carbon atoms the hydrocarbon resin being composed of aliphatic dienes and mono-olefins per 100 parts by weight of the neutralized sulfonated polystyrene resin.

Broadly speaking, synthetic adhesives used in packaging can be classified into four categories: water based, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed. Besides this energy requirement for the formation of the bond, there is another complication with the use of water based adhesive. For a uniform coating a good uniform wetting of the substrate surface is desired, which is not easily achieved.

With the solvent-based adhesives usually a good wetting is achieved; however, their use has been becoming extremely restrictive due to expensive energy requirements for the evaporation of organic solvents fire hazards associated with the use of these organic solvents and emissions problems with said solvents. The strict government environmental regulations and restrictions concerning worker's exposure to solvent vapors, etc. has placed extra pressure on the packager to use non-solvent based adhesives.

Recently the use of hot melt adhesives has been growing very rapidly in the packaging industry. The hot melt adhesives are generally applied (as the name implies) by conventional extrusion or coating techniques in the temperature range of 250° to 450° F. on one of the surfaces to be bonded. The other surface is brought in contact with the hot surface for a sufficient period of time for the melt to cool, whereupon solidification a strong and durable bond is formed.

The key requirements of resins suitable for hot melt adhesive applications are that they should have good physical properties, e.g., tensile strength, etc., at ambient conditions, and they can flow easily at fabrication temperatures. The ethylene vinyl acetate (EVA) copolymers and styrene block copolymers, such as Kraton, have been extensively used as hot melt adhesives; however, their use has been limited largely to pressure sensitive adhesives.

There is a significant demand in the marketplace today for polymer systems which exhibit good green strength or tensile properties at ambient temperatures which, when heated to a predetermined temperature, will give good flow such that they may be applied to a coating or substrate by melt extrusion or other suitable techniques. In the past it has been common to employ organic solutions as a way of applying a coating of a polymer system which is designed to have good adhesive properties. This practice is now under considerable pressure, due to the fact that the organic solvents must be evaporated from the coating giving rise to pollution problems and excess energy requirements.

2. Prior Art

Several U.S. Patents have described sulfonated polymers such as sulfonated butyl and sulfonated EPDM in adhesive applications (e.g., U.S. Pat. No. 3,867,247 and U.S. Pat. No. 3,801,531). It is important to distinguish the instant invention over those prior art systems. The former patent is directed at a sulfonated butyl cement which is solvent based and is employed to laminate various substrates. It is important to note that the instant invention differs dramatically from that patent as follows:

(a) The adhesives of the instant invention are not deposited from solvents but are hot melt and require no solvents.

(b) The adhesive of the instant invention incorporates substantial levels of a highly unsaturated hydrocarbon rubber which is a critical component of these systems.

(c) The instant invention may optionally include a preferential plasticizer capable of associating with the metal sulfonate groups and thereby reducing the melt viscosity of the resulting blends to make the systems more processable;

(d) The instant invention is directed at sulfonated polystyrene resin whereas most of the prior art deals with sulfonated Butyl rubber (e.g., U.S. Pat. No. 3,867,247).

With regard to the latter point, historically polystyrene systems do not possess any tack properties at all. This problem becomes even more acute when polystyrene is sulfonated to levels of 5 to 250 milliequivalents (meq.) per 100 grams of polymer and neutralized. The resulting compositions have been widely used as the basis for ionically crosslinked thermoplastics elastomers. The use of these materials in such applications is, in part, a demonstration that the properties of such materials are just the opposite of those desired for adhesive. In fact such materials are remarkably devoid of tack or adhesion. The tack, therefore, of converting such physically crosslinked materials into suitable adhesive candidates is a particularly challenging one for two reasons: (a) the polystyrene backbone is particularly unsuited for that purpose being a very dry thermoplastic; (b) the strong associations attributable to metal sulfonate crosslinks further inhibit adhesion to any particular substrate.

Despite these handicaps there are some very good reasons for solving the problems associated with converting sulfonated polystyrene into a good hot melt adhesive composition. The excellent thermal stability inherent in the polystyrene backbone is a very desirable property for adhesives which will be exposed to high temperatures for long times. Most adhesives based on other elastomeric backbones can suffer degradation under those conditions.

SUMMARY OF THE INVENTION

This invention relates to hot melt adhesive compositions which include a highly unsaturated hydrocarbon rubber, about 80 to about 100 parts by weight of the neutralized sulfonated polystyrene resin which has about 5 to about 250 meq. of neutralized sulfonate groups per 100 grams of the neutralized sulfonated polystyrene resin and about 25 to about 200 parts by weight of a hydrocarbon resin of a petroleum or coal tar distillate, having about 5 to about 6 carbon atoms, said hydrocarbon resin having aliphatic dienes and monoolefins therein per 100 parts by weight of the neutralized sulfonated polystyrene resin and optionally, about 1 to about 50 parts of a preferential plasticizer per 100 parts of the neutralized sulfonated polystyrene resin can be added to the composition.

General Description

The present invention relates to unique and novel hot melt adhesive compositions which comprise a blend of a neutralized sulfonated polystyrene resin and a hydrocarbon resin, wherein to the compositions can be optionally added an ionic preferential plasticizer oil, and/or a filler thereby modifying the rheological and physical properties of the hot melt adhesive compositions.

Sulfonated Polymer and Process for Forming

The neutralized sulfonated thermoplastic polymers of this present instant invention are derived from polystyrene resins.

The polystyrene thermoplastics suitable for use in the practice of the invention have a glass transition temperature from about 90° C. to about 150° C., more preferably about 90° C. to about 140° C. and most preferably about 90° C. to about 130° C. These polystyrene resins have a weight average molecular weight of about 5,000 to about 500,000 more preferably about 20,000 to about 350,000 and most preferably about 90,000 to about 300,000. These base polystyrene thermoplastic resins can be prepared directly by any of the known polymerization processes. The term "thermoplastic" is used in its conventional sense to mean a substantially rigid (flexus modulus > 10,000 psi) material capable of retaining the ability to flow at elevated temperatures for relatively long times.

The preferred polystyrene thermoplastic resin is a homopolymer of styrene having a number average molecular weight of about 100,000 and an intrinsic viscosity in toluene of about 0.8. These polymers are widely available commercially in large volume. A suitable material is Dow Polystyrene 666 which affords a suitable molecular weight.

The sulfonated polystyrene resins are formed by dissolving the polystyrene resin in a non-reactive solvent such as chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, incorporated herein by reference. The sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting of benzoyl, acetyl, propionyl and butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polystyrene backbone. The reaction is quenched with an aliphatic alcohol such as methanol, ethanol or isopropanol, with an aromatic hydroxyl compound, such as phenol, and a cycloaliphatic alcohol such as cyclohexanol or with water. The sulfonated polystyrene resin has about 80 to about 250 meq. sulfonate groups per 100 grams of sulfonated polystyrene, more preferably about 123 to about 250; and most preferably about 145 to about 250. The meq. of sulfonate groups per 100 grams of polymer is determined by both titration of the polymeric sulfonic acid and Dietert Sulfur analysis. In the titration of the sulfonated polymer, the polymer is dissolved in solvent consisting of 95 parts of toluene and 5 parts of methanol at a concentration level of 50 grams per liter of solvent. The sulfonated polystyrene resin is titrated with ethanolic sodium hydroxide to an Alizarin-Thymolphthalein end-point.

The sulfonated polystyrene resin is gel free and hydrolytically stable. Gel is measured by stirring a given weight of polymer in a solvent comprised of 95 toluene-5-methanol at a concentration of 5 wt. % for 24 hours, allowing the mixture to settle, withdrawing a weighed sample of the supernatant solution and evaporating to dryness. Hydrolytically stable means that the acid function, in this case the unneutralized sulfonate groups, will not be eliminated under neutral or slightly basic conditions to a neutral moiety which is incapable of being converted to highly ionic functionality.

Neutralization of the sulfonated polystyrene resin is done by the addition of a solution of a basic salt to the unneutralized sulfonated polystyrene resin dissolved in the mixture of the aliphatic alcohol and nonreactive solvent. The basic salt is dissolved in a binary solvent system consisting of water and/or an aliphatic alcohol. The counterion of the basic salt is selected from a carboxylic acid having from about 1 to about 4 carbon atoms, a hydroxide, or alkoxide having about 1 to about 4 carbon atoms, and mixtures thereof. The preferred neutralizing agent is a metal acetate, more preferably zinc acetate. Sufficient metal salt of the carboxylic acid is added to the solution of the acid form of the sulfonated polymer to effect neutralization. It is preferable to neutralize at least 95% of the unneutralized sulfonate groups, more preferably about 98%, most preferably 100%. Examines of metal oxides useful in preparing metal sulfonates are MgO, CaO, BaO, ZnO, $Ag_2O$, $PbO_2$, $Pb_3O_4$. Useful examples of metal hydroxides are NaOh, KOH, LiOH, $Mg(OH)_2$ and $Ba(OH)_2$. Alternatively, the unneutralized sulfonated groups of the unneutralized sulfonated polystyrene resin can be neutralized with an organic amine such as described in U.S. Pat. No. 3,642,728 which is incorporated herein by reference. The useful amines can be primary ($RNH_2$), secondary ($R_2NH$), or tertiary ($R_3N$) amines wherein the R groups of the amines can be $C_1$ to $C_{30}$ straight chain or branched chain alkyl groups, cycloalkyl groups, aryl groups and aralkyl groups and mixtures thereof.

Plasticizers

The metal sulfonate containing polymers at higher sulfonate levels can possess extremely high melt viscosities and are thereby difficult to process. The optional addition of ionic group (preferential) plasticizers markedly reduced melt viscosity and frequently enhances physical properties. To the neutralized sulfonated polystyrene is added, in either solution or to the crumb of the sulfonated polystyrene resin, a preferential plasticizer selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead and Groups IA, IIA, IB and IIB of the Periodic Table of Elements and mixtures thereof. The carboxylic acids are selected from the group consisting of lauric, myristic, palmitic or stearic acids and mixtures thereof; e.g., zinc stearate, magnesium stearate, or zinc laurate.

The preferential plasticizer is incorporated into the neutralized sulfonated polystyrene resin at about 3 to about 75 parts by weight based on 100 parts by weight of the neutralized sulfonated polystyrene resin, more preferably at about 7 to about 50, and most preferably at about 10 to about 30. The metallic salt of the carboxylic acid can also be used as neutralizing agent. In the case of the neutralizing agent and plasticizer being the identical chemical species, additional metallic salt is added over the required levels of neutralization. Alternatively, other preferential plasticizers are selected from amines, amides such as stearamide, ammonium and amine salts of carboxylic acids and mixtures thereof. The preferred plasticizers are selected from carboxylic acids having about 8 to about 22 carbon atoms or metallic salts of these carboxylic acids and mixtures thereof. The resultant neutralized sulfonated polystyrene resin with preferential plasticizer is isolated from the solution by conventional steam stripping and filtration.

Commercial Tackifier Resins

To the neutralized sulfonated polystyrene resin is added a commercial tackifying resin having a softening point of about 0° to about 160° C., more preferably about 50° to about 140° C. and most preferably about 70° to 120° C. A variety of commercial tackifier resins are available. Some of these resins contain α and/or β pirene base polyterpene resins as the main ingredient while others are derived from the polymerization of petroleum or coal distillates which consist of aliphatic dienes, mono and di-olefins and cyclic olefins having about 5 to about 6 carbon atoms. The latter type of tackifiers have primarily piperlene and/or isoprene structure. A general but excellent description of tackifying resins derived from petroleum derivatives can be found in, for example, *Encyclopedia of Polymer Science and Technology*, Vol. 9, Pages 853 to 860, chapter by John Findlay, Published by John Wiley & Sons, NY(1968).

Typical but non-limiting tradenames of these commercial tackifiers are Wingtak of Goodyear, Escorez of Exxon, Piccolyte of Hercules and Zonrez of Arizona Chemicals. Recently these and various other companies have also started marketing relatively higher softening point resins. These are generally modified aliphatic hydrocarbon resins and/or hydrogenated polycyclics.

The physical appearance of these commercial tackifying resins varies, depending upon their softening point, they can be either viscous liquids or light-colored solids at room temperature. Most often their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogeneous, it spreads the number average molecular weight $M_n$ can be from about 300 to about 5000 and more preferably about 500 to about 2000 and most preferably about 700 to 1600.

As well-known to those familiar with the use of tackifying resins, because of their wide range compatibility, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the hot melt adhesive composition at about 25 to about 700 parts by weight per 100 parts by weight of the neutralized sulfonated polystyrene resin, more preferably about 50 to about 500, and most preferably about 75 to about 300.

Method of Forming Blend Adhesive Composition

The blend composition of the neutralized sulfonated polystyrene resin with or without preferential plasticizer and the hydrocarbon tackifier resin can be formed by techniques well-known in the art. For example, the blend composition of the hot melt adhesive can be compounded on a hot two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

Extended Blend Adhesive Composition

To the blend compositions of the hot melt adhesive compositions can be added fillers which are selected from the group consisting of talcs, ground calcium carbonate, water precipitated calcium carbonate, delaminated, calcined or hydrated clays, silicas, and carbon blacks, and mixtures thereof. These fillers are incorporated into the blend composition at about 5 to about 800 parts by weight per 100 parts by weight of the neutralized sulfonated polystyrene resin, more preferably at about 50 to about 500; and most preferably at about 75 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Absorption grams of oil/100 grams of filler | Specific Gravity | Avg. Particle Size Micron | pH |
|---|---|---|---|---|---|
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |

Oil Extended Adhesive Compositions

It is observed that the blend composition of the instant invention can also include oils to further improve low temperature properties and tack characteristics of the resulting adhesive's levels of oil of less than about 100 parts by weight per 100 parts of the neutralized sulfonated polystyrene resin can be incorporated, more preferably about 1 to about 90 parts. Oils are particularly useful when high levels of petroleum resin tackifiers are used since such materials can harden the resulting composition. Oils can further soften and reduce the cost. Typical oils that can be used may be low viscosity aromatic, naphthenic or paraffin petroleum oils. Typical oils are illustrated in Table II.

TABLE II

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

Method of Fabrication of Adhesive Compositions

Because of the significant advances in the packaging technology, the hot melt adhesive compositions can be used by conventional polymer fabricating techniques. After the blending is complete, the adhesive mass can either be extruded and/or calendered to a uniform thickness on top of the substrate which could be paper, cloth, aluminum foil or glass fabric. The temperature and the through put of the extrusion are variable depending upon the viscosity of the tackifying mass and the desired coating thickness. Typically the temperature of extrusions and rolls may be from about 200° to 400° F. The substrates or backings to which the pressure sensitive adhesive compositions are applied may be of various porous or nonporous types and they may be organic or inorganic in nature. Most generally, these materials are those which are customarily employed in pressure sensitive tapes, either the cloth or paper backed types or tape backings made of synthetic materials, for example, polyesters such as the copolymer of ethylene glycol with terephthalic acid, vinyls such as a copolymer of vinylidene chloride and vinyl chloride, or a copolymer of vinylidene chloride with acrylonitrile, cellophane, cellulose acetate, polyvinyl chloride, polyvinyl acetate, polypropylene, polyethylene, ethylene-propylene plastic copolymer. Sheetings and tapes of cloth or textiles of either natural or synthetic fiber origin, such as glass fiber cloth, wood, and finally sheets or strips of metals such as steel, copper, aluminum, and alloys thereof can also be employed. In general, the backings employed are those which have been heretofore conventionally employed in preparing pressure sensitive labels, tapes, sheetings and the like and the selection of any particular substrate material is not a specific novel feature of the present invention.

DETAILED DESCRIPTION OF THE INVENTION

The advantages of both the physical properties and adhesive characteristics of the blend compositions of the present invention can be more readily appreciated by references to the following examples and tables. Unless otherwise specified all the measurements of the compositions are in parts per hundred by weight.

EXAMPLE 1

Preparation of Sulfonated Polystyrenes

Two hundred grams of the commercial polystyrene (Styron 666 of Dow Chemical Co.) were dissolved in 1000 ml. of 1,2-dichloroethane at 50° C. After complete dissolution of the polymer appropriate amounts of acetic anhydride was added followed by concentrated sulfuric acid dropwise. The reaction mixture was stirred for about 60 minutes. The sulfonation reaction was then terminated with about 50 ml. of methanol. The neutralization of the sulfonic acid derivative was done through the addition of tri-n-butylamine. The neutralized polymer solution was steam stripped and the resultant polymer was washed with water in a Waring blender. The polymer was filtered and dried in an aeromatic drier at 100° C.

The detailed composition of various ingredients used in the preparation of samples are listed in Table III. In Table IV all the analytical data and the physical properties of these polymers are shown. The sulfur content and the melt index data of Table IV were obtained by the Dietert Sulfur Analysis and ASTM Test method respectively.

TABLE III

COMPOSITION AND PREPARATION OF TRI-N-BUTYL AMINE NEUTRALIZED SULFONATED POLYSTYRENES

| Sample # | 1 | 2 | 3 | 4 |
|---|---|---|---|---|
| Styron 666 (gm) | 200 | 200 | 200 | 200 |
| 1,2-dichloroethane (ml) | 2000 | 2000 | 2000 | 2000 |
| Acetic Anhydride (ml) | 19.1 | 42.9 | 76.6 | 122.5 |
| Conc. $H_2SO_4$ (ml) | 7.0 | 15.7 | 28.1 | 44.9 |
| Methanol (ml) | 50 | 50 | 50 | 50 |
| Tri-n-butylamine (gm) | 46.3 | 103.8 | 185.4 | 296.6 |

TABLE IV
ANALYSIS AND PHYSICAL PROPERTIES OF TRI-N-BUTYLAMINE NEUTRALIZED SULFONATED POLYSTYRENES

| Sample # | 1 | 2 | 3 | 4 |
|---|---|---|---|---|
| % Nitrogen | 0.81 | 1.42 | 1.81 | 2.19 |
| % Sulfur* | 1.56 | 2.51 | 3.83 | 4.55 |
| Meq. Sulfonate groups per 100 gm of Polymer | 49.9 | 80.3 | 122.6 | 145.6 |
| Melt Index @** 190° C., 250 Psi; gm/10 min. | 32.9 | 60.8 | 38.4 | 59.0 |

*Dietert Analysis
**ASTM Test

EXAMPLE 3

Various blends of the tri-butyl amine sulfonated polystyrene with commercial tackifier resins such as Wingtak plus optionally incorporating saturated or unsaturated hydrocarbon polymers such as polyisoprene and polybutadiene were made. Illustrative examples of these blends are shown in Table V. The blending of the various ingredients were done on a hot two-roll mill at about 100° C. for about 15 to 30 minutes till a homogeneous system was achieved for comparative purposes a binary blend of Kraton 1107 with Wingtak plus tackifying resin is also included. This blend is designated as blend number 5-1. Tackifying resin Wingtak plus is a solid synthetic polyterpene resin marketed by Goodyear Corporation with a softening point of about 94° C., a specific gravity of 0.93 and a weight average molecular weight of 1100. Other tackifying resins such as Exxon's Escorez 1310 could be used as well, and will yield blend compositions of satisfactory adhesive characteristics. Information regarding the Kraton block polymer appears as a footnote at the bottom of Table V. Both qualitative and quantitative properties of the blends of Table V are shown in Table VI.

TABLE VI
PROPERTIES OF THE BLENDS OF SULFONATED POLYSTYRENE POLYMERS WITH VARIOUS ELASTOMERS AND PETROLEUM RESINS

| Blend # | Green Strength | Tackiness | Peel Strength (lbs.-force) |
|---|---|---|---|
| 3-1 | High | Tacky | 11.1 |
| 3-2 | High | Tacky | 1.35 |
| 3-3 | Medium | Tacky | 0.9 |
| 3-4 | High | Tacky | 10.8 |
| 3-5 | Medium | Very Tacky | 5.2 |
| 3-6 | Medium | Very Tacky | 2.4 |
| 3-7 | Medium | Very Tacky | 1.1 |
| 3-8 | High | Very Tacky | 8.5 |
| 3-9 | Medium | Very Tacky | 3.0 |

The peel strength values were obtained by a method similar to ASTM D-429 adhesion test. In brief, the samples were sandwiched between mylar sheets and pressed to a thickness of about 25 mils using a hot press. Rectangular strips of ¼" width and 3" long were cut and 90° peel tests were performed on an Instron at room temperature. The resin free sections of the mylar film were clamped into air jaws to avoid any slippage during pulling. The samples were pulled at 5"/min. crosshead speed. The force and elongation of the samples were recorded on a strip recorder. The force necessary to separate the mylar sheets was taken as the peel strength of the blend. The initial peak values are reported in the fifth column of Table IV.

What is claimed is:
1. A hot melt adhesive composition which comprises:
   (a) a highly unsaturated polybutadiene or polyisoprene hydrocarbon rubber;
   (b) a neutralized sulfonated polystyrene resin said neutralized sulfonated polystyrene having about 80 to 250 meq. of neutralized sulfonated groups per 100 grams of said neutralized sulfonated polystyrene resin; and
   (c) about 25 to about 200 parts by weight of a hydrocarbon tackifying resin based on a petroleum or

TABLE V
COMPOSITION OF BLENDS OF SULFONATED POLYSTYRENE POLYMERS WITH VAIOUS ELASTOMERS AND PETROLEUM RESINS

| Blend # | 3-1 | 3-2 | 3-3 | 3-4 | 3-5 | 3-6 | 3-7 | 3-8 | 3-9 |
|---|---|---|---|---|---|---|---|---|---|
| Kraton 1107* | 50 | — | — | — | — | — | — | — | — |
| Sulfonated Polystyrenes (tributylamine salt; 50 meq.) | — | 50 | 50 | — | — | — | — | — | — |
| Sulfonated Polystyrene (tributyl amine salt; ~80 meq. | — | — | — | 50 | 50 | — | — | — | — |
| Sulfonated Polystyrene (tributylamine salt; 123 meq.) | — | — | — | — | — | 50 | 50 | — | — |
| Sulfonated Polystyrene (tributylamine salt; ~145 meq.) | — | — | — | — | — | — | — | 50 | 50 |
| Polyisoprene | — | 50 | — | 50 | 50 | 50 | — | — | — |
| Polybutadiene | — | — | 50 | — | — | — | 50 | 50 | 50 |
| Wingtak Plus | 50 | 100 | — | 100 | — | 100 | — | 100 | — |
| Escorez 2101 | — | — | 100 | — | 100 | — | 100 | — | 100 |

*Blend #3-1 is included here for comparative purposes. It is one of the widely used adhesive compositions. Kraton 1107 is a block copolymer of the structure ABA in which A is a block of styrene (total ~ 15% by weight) whose number average molecular weight is in the range of 10,000 to 30,000. B is an elastic block of isoprene (~85%) having a number average molecular weight of about 100,000.

coal tar distillate per 100 parts by weight of said neutralized sulfonated polysytrene resin.

2. A hot melt adhesive composition according to claim 1, wherein said neutralized sulfonate groups are neutralized with a counterion selected from the group consisting of amines ammonium, aluminum, antimony, iron, lead and Groups IA, IIA, IB and IIB of the Periodic Table of Elements.

3. A hot melt adhesive composition according to claim 1, wherein said neutralized sulfonate groups are neutralized with zinc ions.

4. A hot melt adhesive according to claim 1 further including about 3 to about 75 parts by weight of an ionic preferential plasticizer per 100 parts by weight of said neutralized sulfonated polystyrene resin, wherein said preferential plasticizer is selected from the group consisting of carboxylic acids having about 8 to about 22 carbon atoms, metallic salts of said carboxylic acids, amides having an aliphatic group of about 8 to about 22 carbon atoms, amines, ureas and thioureas and mixtures thereof.

5. A hot melt adhesive according to claim 4, wherein said preferential plasticizer is said metallic salt of said carboxylic acid.

6. A hot melt adhesive composition according to claim 5, wherein said metallic salt of said carboxylic acid is zinc stearate.

7. A hot melt adhesive composition according to claim 1, further including about 5 to about 800 parts by weight of a filler per 100 parts by weight of said neutralized sulfonated polystyrene resin, said filler being selected from the group consisting of calcium carbonates, silicas, carbon blacks, clays and talcs and mixtures thereof and/or less than about 100 parts by weight of an oil having less than 2 wt. % polars per 100 parts by weight of said neutralized sulfonated polystyrene resin.

8. A hot melt adhesive composition according to claims 1,2 or 7 wherein said hydrocarbon resin has about 5 to about 6 carbon atoms and consists of aliphatic dienes, mono- and di-olefins and cyclic olefins.

9. A hot melt adhesive composition according to claim 1 further including from about 1 to about 100 parts by weight of an oil per 100 parts by weight of said highly unsaturated hydrocarbon resin, said oil being an aromatic, naphthenic or paraffinic basestock.

10. An adhesive composition according to claim 1, further including an unsaturated hydrocarbon resin.

* * * * *